(12) United States Patent  
Chandramouli et al.

(10) Patent No.: US 10,949,427 B2  
(45) Date of Patent: Mar. 16, 2021

(54) STREAM DATA PROCESSING ON MULTIPLE APPLICATION TIMELINES

(71) Applicant: Microsoft Technology Licensing, LLC, Redmond, WA (US)

(72) Inventors: Badrish Chandramouli, Redmond, WA (US); Jonathan Goldstein, Woodinville, WA (US); Michael Barnett, Seattle, WA (US); James Felger Terwilliger, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 522 days.

(21) Appl. No.: 15/588,299

(22) Filed: May 5, 2017

(65) Prior Publication Data

US 2018/0218048 A1 Aug. 2, 2018

Related U.S. Application Data

(60) Provisional application No. 62/452,742, filed on Jan. 31, 2017.

(51) Int. Cl.
```
G06F 17/00      (2019.01)
G06F 16/2455    (2019.01)
G06F 7/08       (2006.01)
```
(52) U.S. Cl.
CPC .......... *G06F 16/24568* (2019.01); *G06F 7/08* (2013.01)

(58) Field of Classification Search
CPC .... G06F 16/122; G06F 16/137; G06F 16/162; G06F 16/17; G06F 16/173; G06F 16/174
See application file for complete search history.

(56) References Cited

U.S. PATENT DOCUMENTS 8,041,530 B2 10/2011 Kalb et al.
9,015,379 B1  4/2015 Bobrek
(Continued)

FOREIGN PATENT DOCUMENTS

EP        2946528 A2    11/2015

OTHER PUBLICATIONS

"Overview of Internet of Things", https://cloud.google.com/solutions/iot-overview, Published on: Oct. 4, 2016, 19 pages.
(Continued)

*Primary Examiner* — Truong V Vo
(74) *Attorney, Agent, or Firm* — Workman Nydegger (57) ABSTRACT

Accommodating a particular kind of out-of-order data; namely, when data arrives out-of-order because the data is generated in systems that may have different application timelines. As data arrives, it arrives with a particular partition key. For instance, the partition key might identify the source of the data. The data from each partition key is kept in-order with respect to all other data from that same partition key. That said, data from one key is permitted to have a different timeline as compared to data from any other key. Thus, the data may not be in-order when viewed globally across keys. Rather, data is tolerated to be out-of-order globally so long as the lag in the arrived data is within some tolerated lag. If the data arrives having a time that exceeds the maximum tolerated lag, then the system applies some policy to determine what to do with the delayed data.

20 Claims, 4 Drawing Sheets

(56) References Cited

U.S. PATENT DOCUMENTS

| | | | |
|---|---|---|---|
| 2008/0263012 A1* | 10/2008 | Jones | G09C 1/00 |
| 2009/0287456 A1 | 11/2009 | Tran et al. | |
| 2009/0319687 A1 | 12/2009 | Goldstein et al. | |
| 2011/0040827 A1* | 2/2011 | Katsunuma | G06F 16/24568 709/203 |
| 2011/0234378 A1* | 9/2011 | Radley | G01T 7/00 340/10.1 |
| 2011/0302164 A1 | 12/2011 | Krishnamurthy et al. | |
| 2013/0166766 A1 | 6/2013 | Nahrstedt et al. | |
| 2015/0317363 A1* | 11/2015 | Manzano Macho | G06N 20/00 706/12 |
| 2016/0088588 A1 | 3/2016 | Uusitalo et al. | |
| 2016/0359703 A1 | 12/2016 | Gandham et al. | |

OTHER PUBLICATIONS

Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, No. 12, Aug. 2015, pp. 1792-1803.

Li, et al., "Event Stream Processing with Out-of-Order Data Arrival", In the Proceedings of 27th International Conference on Distributed Computing Systems Workshops, Jun. 22, 2007, 8 Pages.

"International Search Report and Written Opinion Issued in PCT Application No. PCT/US2017/068067", dated Mar. 20, 2018, 11 Pages.

* cited by examiner

STREAM DATA PROCESSING ON MULTIPLE APPLICATION TIMELINES

CROSS-REFERENCE TO RELATED APPLICATIONS

This application claims the benefit of U.S. Provisional application 62/452,742 filed Jan. 31, 2017, titled "STREAM DATA PROCESSING ON MULTIPLE APPLICATION TIMELINES", which is incorporated herein by reference in its entirety.

BACKGROUND

Computing systems and associated networks have greatly revolutionized our world ushering in what is now commonly called the "information age". One of the characteristics of the information age is that queries may be generated and issued against collections of data. For instance, the data collections may include relational databases, or other data stores of structured, or even unstructured data. Now, queries may even be generated against streams of data that are organized in accordance with time. An example of streamed data is a stream of time-stamped events.

When processing streams of data, the processing often occurs assuming that the streamed data arrives in some semblance of temporal order. The assumption of temporal ordering is made for several reasons, mostly for performance optimization. But the assumption is generally well-founded based on the use cases commonly used in streaming data processing. The ideal case is always in-order arrival of streamed data. However, data may arrive out of order due to various environmental or system causes (such as network delays). Thus, out-of-order data arrival is a real-world scenario that requires accommodation but not part of the optimal data processing path.

Out-of-order processing is generally dealt with by a streaming data processor in one of two different ways. In one conventional way, all out of order data is made to be in order at the time that data ingresses into the system. This can be done by waiting a period to sort the out-of-order data to be in order, by adjusting the time-stamp(s) of the out-of-order data to be in order, or by dropping one or more pieces of out-of-order data such that the remaining data is in order. Once data is inside the system, the streaming engine may operate on the data knowing the data is safely in order and optimize for that case. In a second conventional way of dealing with out-of-order data, all processing done within the system accommodates out-of-order data, and it becomes up to the system user to decide what to do when out-of-order data arrival happens.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to accommodating a particular kind of out-of-order data; namely, when data arrives out-of-order because the data is generated in systems that may have different application timelines. As an example, the data may arrive from different sources that each have their own potentially different application times. In accordance with the principles described herein, as data arrives, it arrives with a particular partition key. For instance, the partition key might identify the source of the data. The principles described herein ensures that each data from each partition key is kept in-order with respect to all other data from that same partition key (which property is referred to hereinafter as "in-order intra-key"). That said, data from one key is permitted to have a different timeline as compared to data from any other key. Thus, the data may not be in-order when viewed globally across keys.

However, in accordance with the principles described herein, data is tolerated to be out-of-order globally so long as the lag in the arrived data is within some tolerated lag. If the data arrives having a time that exceeds the maximum tolerated lag, then the system applies some policy to determine what to do with the delayed data. The policy may specify that the data be dropped, that the timestamp of the data be adjusted to be within tolerance, and/or that the data should be reordered to allow the delayed data to be placed globally in-order (or at least globally in-order to within the tolerated lag).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to accommodating a particular kind of out-of-order data;

namely, when data arrives out-of-order because the data is generated in systems that may have different application timelines. As an example, the data may arrive from different sources that each have their own potentially different application times. In accordance with the principles described herein, as data arrives, it arrives with a particular partition key. For instance, the partition key might identify the source of the data. The principles described herein ensures that each data from each partition key is kept in-order with respect to all other data from that same partition key (which property is referred to hereinafter as "in-order intra-key"). That said, data from one key is permitted to have a different timeline as compared to data from any other key. Thus, the data may not be in-order when viewed globally across keys.

However, in accordance with the principles described herein, data is tolerated to be out-of-order globally so long as the lag in the arrived data is within some tolerated lag. If the data arrives having a time that exceeds the maximum tolerated lag, then the system applies some policy to determine what to do with the delayed data. The policy may specify that the data be dropped, that the timestamp of the data be adjusted to be within tolerance, and/or that the data should be reordered to allow the delayed data to be placed globally in-order (or at least globally in-order to within the tolerated lag).

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As the principles described herein (and particularly, the queries on data streams) may be performed by a computing system, a computing system will first be described with respect to FIG. 1. Then the principles of query operation will thereafter be described with respect to subsequent FIGS. 2 and 3. Example queries will then be described with respect to FIGS. 4 through 9.

Figure 1:
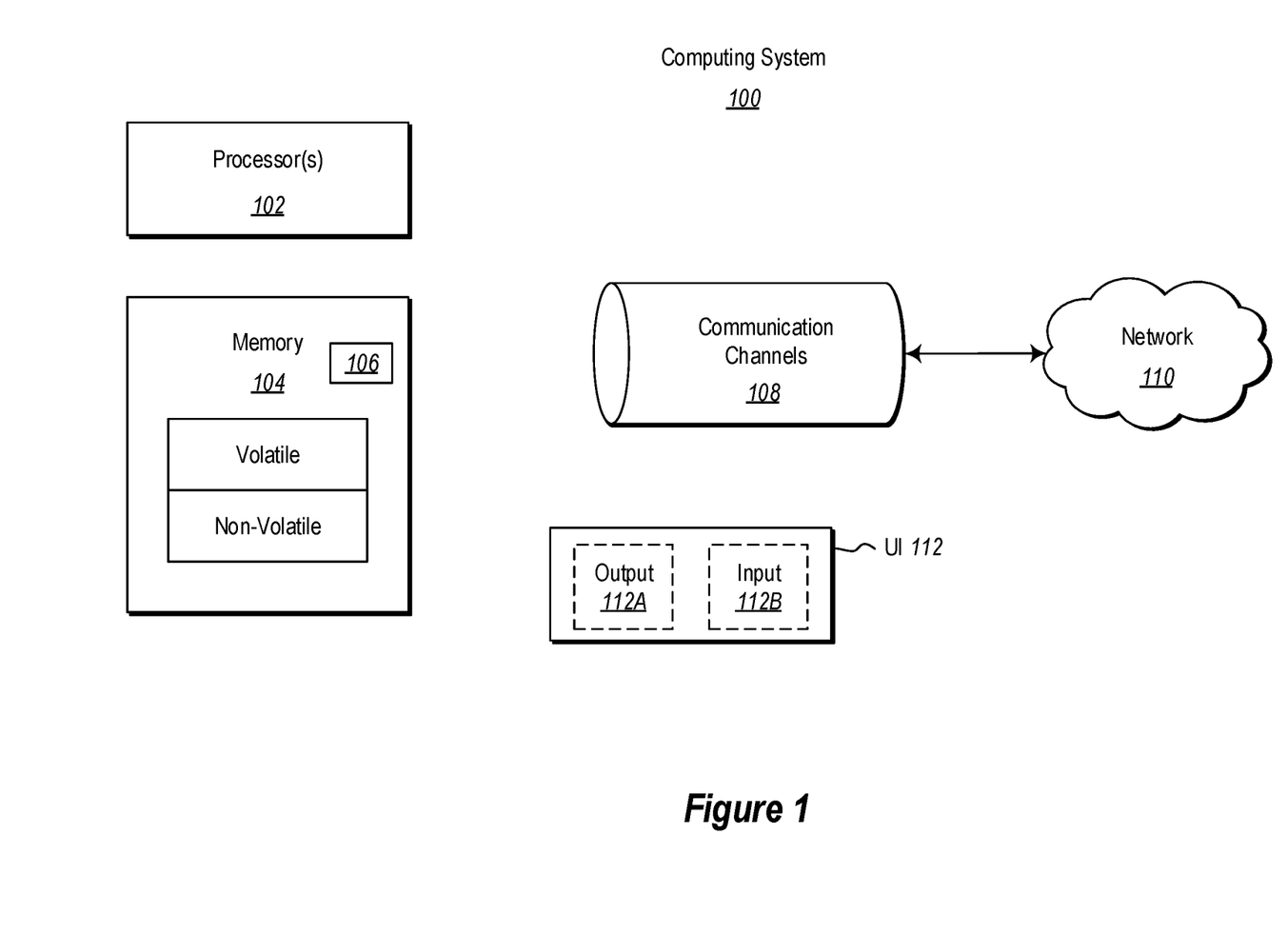
FIG. 1 illustrates an example computer system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Embodiments described herein accommodate a particular kind of out-of-order data; namely, when data arrives out-of-order because the data is generated in systems that may have different application timelines. As an example, the data may arrive from different sources that each have their own potentially different application times. In accordance with the principles described herein, as data arrives, it arrives with a particular partition key. For instance, the partition key might identify the source of the data. The principles described herein ensures that each data from each partition key is kept in-order with respect to all other data from that same partition key (which property is referred to hereinafter as "in-order intra-key". That said, data from one key is permitted to have a different timeline as compared to data from any other key. Thus, the data may not be in-order when viewed globally across keys.

However, in accordance with the principles described herein, data is tolerated to be out-of-order globally so long as the lag in the arrived data is within some tolerated lag. If the data arrives having a time that exceeds the maximum tolerated lag, then the system applies some policy to determine what to do with the delayed data. The policy may specify that the data be dropped, that the timestamp of the data be adjusted to be within tolerance, and/or that the data should be reordered to allow the delayed data to be placed globally in-order (or at least globally in-order to within the tolerated lag).

Figure 2:
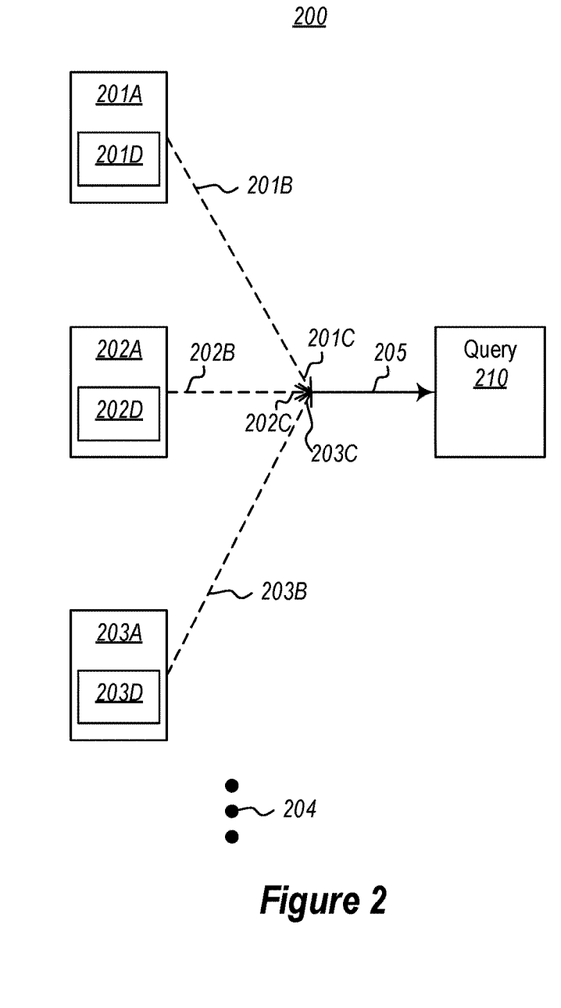
FIG. 2 as follows illustrates a query environment in which a query receives a data stream associated with multiple partition keys.

FIG. 2 as follows illustrates a query environment 200 in which a query 210 receives a data stream associated with multiple partition keys. The query 210 may be a component (such as component 106) that operates upon a computing system (such as computing system 100) bon on a received data stream. For instance, data item source 201A generates a data item stream 201B as represented by arrow 201C and is associated with a first partition key 201D. Data item source 202A generates a data item stream 202B as represented by arrow 202C and is associated with a second partition key 202D. Data item source 203A generates a data item stream 203B as represented by arrow 203C and is associated with a third partition key 203D. Each of the data item streams 201B, 202B and 203B combined to form a consolidated data stream 205 that is received by the query 210. The ellipsis 204 represents that the number of data items sources that provide data item streams into the consolidated data stream may be any number (one or more) data streams, and may indeed be variable over time for any given query.

Figure 3:
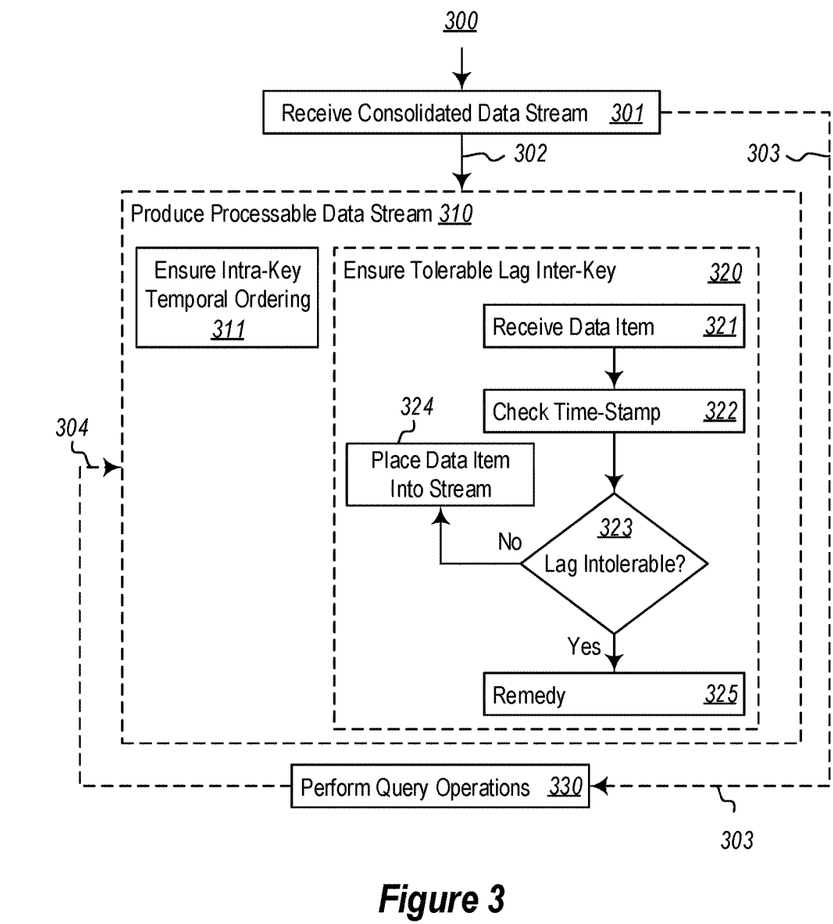
FIG. 3 illustrates a flowchart of a method for performing query processing on streaming data.

FIG. 3 illustrates a flowchart of a method 300 for performing query processing on streaming data. The method 300 may be performed by, for instance, the query 210 of FIG. 2. Furthermore, the computing system 100 may be used by a user to generate the query. Also, the query 210 may operate upon the computing system 100.

The method 300 includes receiving a consolidated data stream of data items for multiple partition keys (act 301). For instance, in FIG. 2, the consolidated data stream 205 includes data stream 201B associated with partition key 201D, data stream 202B associated with partition key 202D, and data stream 203B corresponding to partition key 203D. The query produces a processable data stream (act 310) from the received data stream. This is a continuous process as represented by the arrows 302 and 303.

When producing the processable data stream (act 310), the query ensures that, for each key, the data items for that key are temporally in order in the processable data stream (act 311). In other words, the query ensures the processable data stream is in-order intra-key. This is also a continuous process as the data stream is received (act 301).

Furthermore, the query ensures that each of the data items in the processable data stream does not lag by more than a given tolerance (act 320), which is performed continuously as the consolidated data stream is received (act 301). To do this, when each data item is received (act 321), the query checks the time stamp (act 322). If the time stamp shows as lagging less than the current given tolerance ("No" in decision block 323), then the data item is provided into the processable data stream (act 324). Otherwise, if the time stamp shows as lagging greater than the current given tolerance ("Yes" in decision block 323), a remedy is taken in accordance with a policy (act 325).

Such a remedy could include dropping the corresponding data item such that the corresponding data item is not included within the processable data stream. Alternatively, such a remedy could include fast forwarding the time-stamp of the data item to be the current timestamp, or at least within the lag tolerance. Alternatively, the remedy could include placing the corresponding time stamp in-order in the processable data stream.

Once the processable data stream is produced (act 310), query operations may be performed on the processable data stream (act 330). The arrow 304 represents that the processable data stream may perhaps be just a first stage of the query processing, a second stage processable data stream may be generated. In such subsequent stages, there is no need to do act 320 when producing the subsequent processable data stream as globally all data items are already within a tolerated lag. The subsequent stage might be a processable data stream in which the data items are ensured to be in-order for each of a different set of keys. Alternatively, the subsequent stage may simply be a globally temporally ordered processable stream.

A few examples will now be provided. Consider a scenario where data is coming from a collection of sensors $S_i$ (where "i" is the set of all whole numbers from 1 to the number of sensors in the collection). The data is homogeneous in the sense that all of the data measures the same real-world parameter, such as temperature. Each sensor $S_i$ generates data in temporal order relative to itself. In other words, for every value i, the data from sensor $S_i$ is generated completely in order. In this example, each sensor identifier is a distinct partition key.

That said, the data across sensors may not be in complete total order for a number of reasons. This might be due to the sensors not be in temporal sync. Alternatively or in addition, this might be due to impact of the channels that through which the data from the sensor traveled prior to arrival.

As for the sensors themselves not being temporally synched as a cause for out-of-order data, there might be any number of reasons for this. For instance, the internal clock for one sensor may have drifted relative to other sensors. As another example, the internal clock for one sensor may be with respect to a different time zone as compared to the time zone(s) of other sensors. The latter case might particularly be the case if gathering data from, for instance, mobile phones or computing systems that are globally distributed.

As for the nature of the data channel from the sensor as a cause for out-of-order data, there might be any number of reasons for this as well. The network connections to some sensors may be slower than others. The network connection for a specific sensor may even disappear temporarily and then reconnect, sending all of its data on reconnection in a single burst.

The principles described herein address the real scenarios in which each sensor thus has its own timeline. Let us consider a specific example in which the query receives data from Sensor 1, Sensor 2 and Sensor 3. For purposes of discussion and example only, consider the query receiving the following three data streams (each data stream having three data items, and each data item having a value and a timestamp):

Sensor 1: 5 at time 100, 4 at time 108, 8 at time 109
Sensor 2: 6 at time 1, 10 at time 2, 11 at time 3
Sensor 3: 14 at time 4002, 12 at time 4004, 11 at time 4009

In this example, the streams from each sensor arrive at different times, one sensor at a time. However, the streams for the different sensors may have data that arrive in any order. For instance, a stream from one sensor may have some data that has a timestamp before data from another sensor, and some data that has a timestamp after data from that other sensor.

If the data arrives at the query in the order Sensor 2, Sensor 1, Sensor 3, then all data arrives in temporal order. Recall that the time at which the data arrives at the query need not have any correlation with the time associated with each data item. However, if data arrives in the order Sensor 1, Sensor 2, Sensor 3, then the data from Sensor 2 is now out of order. In that case, if data is expected to arrive in order, then either the data from Sensor 2 is fast forwarded (e.g., to time 109—the time that the latest data from Sensor 1 was observed) or the data from Sensor 2 is dropped, or processing of the data from Sensor 1 is blocked until such time as there is surety that other late data has arrived. On the other hand, if data may be allowed to arrive in arbitrary order, then the system holds data from Sensor 1 in memory until the system is sure that all relevant data for the query has been encountered, and tells the query just how long to wait to do so. Now imagine the data has arrived in the order Sensor 3, Sensor 1, Sensor 2 and note that the above problems are exasperated.

Figure 4:
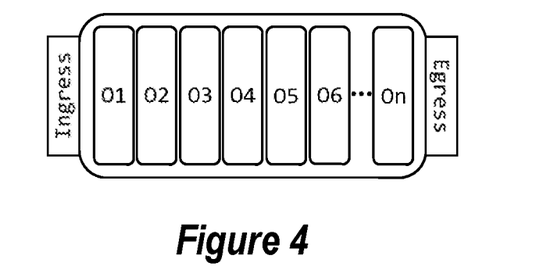
FIG. 4 illustrates an example structure of a query that includes an ingress, multiple operations performed on the ingress, and the result being presented at an egress.

The embodiments described herein can be thought of as logically combining several otherwise identical queries into a single query, where each individual query assumes fully in-order data. Physically, however, the story is much more complicated. Think of a streaming query as a single unit that looks as illustrated in FIG. 4:

There is a point of Ingress, where any policies to enforce data ordering is applied. If out-of-order data is to be dropped, it happens at ingress. If processing needs to be held up for a fixed period T to pick up and sort data that arrives out-of-order up to T behind, then this may be performed at ingress. Next, there are the query operators that make up the actual processing of the query. Any selection, projection, aggregation, joining, or other data analytics happens here. Finally, there is a point of Egress, where the final results of the query are sent to whatever downstream consumers may be waiting for it.

Figure 5:
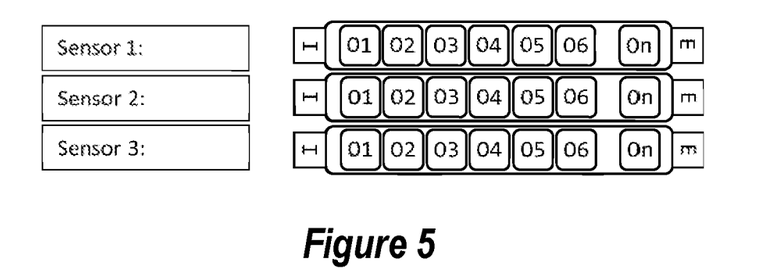
FIG. 5 logically illustrates an example combined query, in which each individual sensor is assigned, in essence, its own query.

So, logically, the combined query looks like that illustrated in FIG. 5. Referring to FIG. 5, each individual sensor is assigned, in essence, its own query. The point of ingress for each query ensures that each individual substream's data is in order, using the same policies that one would apply in a single, uniform query. But those ordering policies are not applied across substreams. Data can progress for each sensor through the query on its own without waiting for other sensors, and without being altered by the progress of other sensors.

Figure 6:
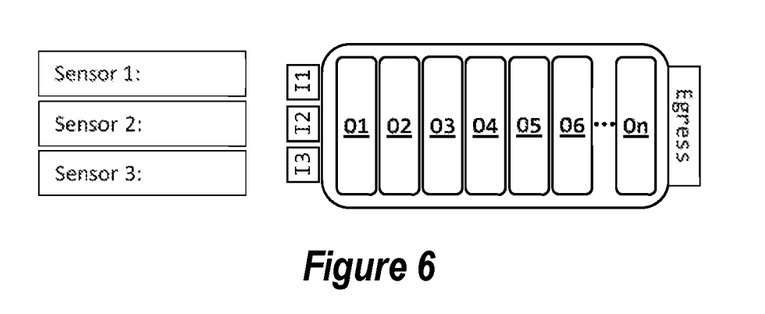
FIG. 6 illustrates more physical the combined query of FIG. 5, which shows that a single query handles all of the data from all partitions.
Figure 7:
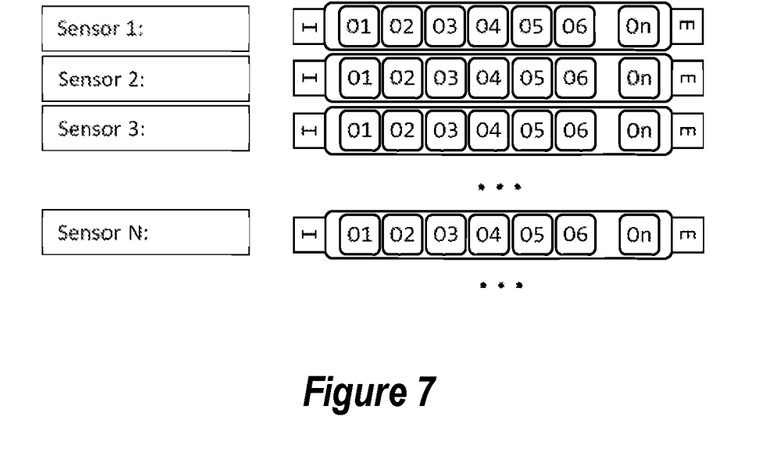
FIG. 7 illustrates the query of FIG. 6, except with three additional augmentations, in which it is not known a priori what the set of partitions is to do the computation.

Physically, however, the query may appear as show in FIG. 6. Referring to FIG. 6, a single query handles all of the data from all partitions. The query is specified in exactly the same way as if one were specifying a single query over a single partition. However, the logical effect is to produce data for each partition independently of one another.

First, note that ingress is still done on a per-partition (e.g., per-sensor) basis. In one implementation, this is actually done all at the same time in a single physical operator, but FIG. 6 shows each ingress site as different to reinforce the notion that each partition has its disorder policies applied individually. Note next that in FIG. 6 the operators in the query are slightly different (as represented by the operators 01 to 0n now being underlined). The exact implementation of each operator are augmented to account for the fact that data is no longer globally in order. Such "augmentation" can be trivial, or complex. From this point forward, consider the term partitioned data mean data that has been assigned some partition key, where all data for any given partition key is in temporal order.

For some operators, there is actually no augmentation required to accommodate the prospect of partitioned data. Such operators fall into two categories—stateless operations that are independent of key, and operators that are done per-key already. Filtering and projection and all operators that do not require augmentation are examples of stateless operators that are not sensitive to the partition key. That is, they do not modify the partition key and thus do not violate the intra-key time-order invariant. These operators act on data as it arrives and is not affected by temporal ordering. Operators that are already done per-key include some kinds of temporal operations. Some operations already naturally act on a per-key basis and are not sensitive to any temporal order across keys. These operators naturally fit into a framework that allows partitioned data.

In a worst case, the partition-aware version of an operator essentially logically keeps the same state and do the same logical processing as N copies of the original operator. There are still many physical optimizations that are possible even in this case. For instance, instead of keeping around N copies of all data structures, the operator can maintain a single data structure with a separate pointer array showing where each partition resides in the larger structure.

However, because the embodiments described herein are not dealing with arbitrary disorder, but only disorder across keys, many operators are able to keep most of their existing memory and speed optimizations, only having to be augmented in the case where a context switch between partitions has some effect.

For example, consider the case of an aggregation operator. For the most part, all of the state computation being done within the aggregation is already being done on a per-key basis. The only change is the case when an incoming data value belongs to a different partition. Rather than advance the time forward for all keys and construct aggregates if necessary, processing can do so for keys that belong to the same partition.

Consider the same sensor data as before. If an aggregate operator sees the value 4 at time 108 from Sensor 1, we may already have data being computed for Sensors 2 and 3 in memory. In a uniform setting, the operator would need to move time forward for both Sensors 2 and 3 if necessary, and compute and return aggregate values if anything has changed. In a partitioned setting, only the aggregate for Sensor 1 is affected.

Suppose that the previous logical diagram of FIG. 6 is to have three additional augmentations. It is not known a priori what the set of partitions is to do the computation. This is reflected in FIG. 7. The system does not need to know at any point in time what the set of possible sensors is. At the time the query starts, there may be Sensors 1, 2 and 3, but later on one may add Sensors 4 through 10, then Sensor 3 goes offline for a while, then Sensor 5 gets blocked but rejoins an hour later, then Sensor 26 comes online. The system just identifies, for any given piece of data, to what partition it belongs. It need not belong to a partition that has already seen data even.

Figure 8:
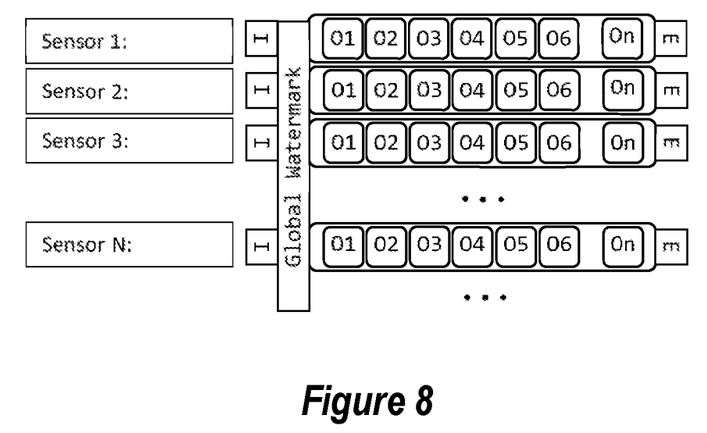
FIG. 8 illustrates an example query that has a global watermark.

Second, the system does allow the query author to establish a relationship across partitions, if requested. The global watermark is a way of being able to specify the following: "For any partition that I see, the time must be constrained to within time T of the partition with the highest time." FIG. 8 illustrates an example query that has a global watermark.

In this context, consider the following sensor data once again:

Sensor 1: 5 at time 100, 4 at time 108, 8 at time 109
Sensor 2: 6 at time 1, 10 at time 2, 11 at time 3
Sensor 3: 14 at time 4002, 12 at time 4004, 11 at time 4009

If the system specifies a global watermark of 2000 and data from Sensor 3 arrives first, then depending on the disorder policy that we specify, the data from Sensors 1 and 2 are either dropped or adjusted to be within the time window (i.e., 2009).

Figure 9:
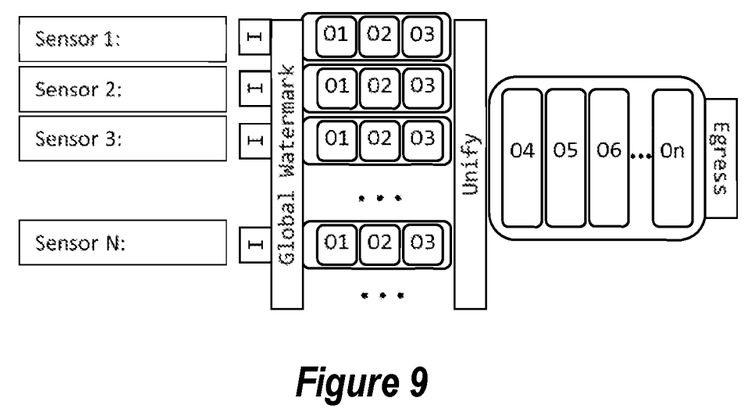
FIG. 9 illustrates an example mixed-mode query.

The system may also allow for a mixed-mode query, where part of the query is partitioned, but at some point, the query must perform some action across partitions, so it must be unified. FIG. 9 illustrates an example of such a mixed-mode query. Referring to FIG. 9, one may want to do part of the query in partitioned mode, where one can try to reduce state size through aggregation or filtration, then finally perform some logic across partitions. One common example is a local-global aggregation, where aggregation is computed across multiple partitions but then state is reduced with a sub-aggregate before having to apply any kind of global reordering. Global reordering can be a costly operation in terms of memory usage, so partitioning, reducing state, and then reordering is a good way to optimize that particular operation.

So, in conclusion, embodiments described herein construction of a query that looks like FIG. 9, and do so with the simplicity and model as if constructing the query of FIG. 4.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors;
   one or more computer-readable media having thereon computer-executable instructions that are structured such that, when executed by the one or more processors, cause the computing system to perform steps for performing query processing on streaming data, the steps comprising:
   receiving a data stream of a plurality of data items for each of a plurality of keys;
   producing a processable data stream that includes all of the received plurality of items, wherein producing the processable data stream comprises:
      for each of the data items from the data stream for each of the plurality of keys, ensuring that the data items for each key of the plurality of keys are temporally in order; and
      for each of the data items in the processable data stream, ensuring that the data items temporally lag no more than a given tolerance in the processable data stream.

2. The computing system in accordance with claim 1, wherein ensuring that the data items temporally lag no more than a given tolerance comprises the following for each of at least one data item in the received data stream that is determined to temporally lag greater than the given tolerance:
   dropping the corresponding data item such that the corresponding data item is not included within the processable data stream.

3. The computing system in accordance with claim 1, wherein ensuring that the data items temporally lag no more than a given tolerance comprises the following for each of at least one data item in the received data stream that is determined to temporally lag greater than the given tolerance:
   fast forwarding a time stamp of the corresponding data item.

4. The computing system in accordance with claim 1, wherein ensuring that the data items temporally lag no more than a given tolerance comprises the following for each of at least one data item in the received data stream that is determined to temporally lag greater than the given tolerance:
   placing the corresponding time stamp in-order in the processable data stream.

5. The computing system in accordance with claim 4, the steps further comprising:
   performing one or more query operations on the processable data stream.

6. The computing system in accordance with claim 5, the query operations comprising per-key query operations.

7. The computing system in accordance with claim 5, the query operations comprising per-key aggregation operations.

8. The computing system in accordance with claim 5, the query operations comprising across key-operations.

9. The computing system in accordance with claim 5, the plurality of keys being a first plurality of keys, the processable data stream being a first processable data stream, the one or more query operations being first one or more query operations, the steps further comprising:
   for data items from the first processable data stream, ensuring that the data items for the corresponding key of a second plurality of keys are temporally in order when producing a second processable data stream; and
   performing one or more query operations on the second processable data stream.

10. The computing system in accordance with claim 5, the plurality of keys being a first plurality of keys, the processable data stream being a first processable data stream, the one or more query operations being first one or more query operations, the steps further comprising:
   for data items from the first processable data stream, temporally ordering the first processable data stream to generate a second processable data stream; and
   performing one or more query operations on the second processable data stream.

11. A method for performing query processing on streaming data, the method comprising:
   receiving a data stream of a plurality of data items for each of a plurality of keys;
   producing a processable data stream that includes all of the received plurality of items, wherein producing the processable data stream comprises:
      for each of the data items from the data stream for each of the plurality of keys, ensuring that the data items for each key of the plurality of keys are temporally in order; and
      for each of the data items in the processable data stream, ensuring that the data items temporally lag no more than a given tolerance in the processable data stream.

12. The method in accordance with claim 11, wherein ensuring that the data items temporally lag no more than a given tolerance comprises the following for each of at least one data item in the received data stream that is determined to temporally lag greater than the given tolerance:
   dropping the corresponding data item such that the corresponding data item is not included within the processable data stream.

13. The method in accordance with claim 11, wherein ensuring that the data items temporally lag no more than a given tolerance comprises the following for each of at least one data item in the received data stream that is determined to temporally lag greater than the given tolerance:
   fast forwarding a time stamp of the corresponding data item.

14. The method in accordance with claim 11, wherein ensuring that the data items temporally lag no more than a given tolerance comprises the following for each of at least one data item in the received data stream that is determined to temporally lag greater than the given tolerance:
   placing the corresponding time stamp in-order in the processable data stream.

15. The computing system in accordance with claim 14, further comprising:
   performing one or more query operations on the processable data stream.

16. The method in accordance with claim 15, the query operations comprising per-key query operations.

17. The method in accordance with claim 15, the query operations comprising per-key aggregation operations.

18. The method in accordance with claim 15, the query operations comprising across key-operations.

19. The method in accordance with claim 15, the plurality of keys being a first plurality of keys, the processable data stream being a first processable data stream, the one or more query operations being first one or more query operations, the method further comprising:
   for data items from the first processable data stream, ensuring that the data items for the corresponding key of a second plurality of keys are temporally in order when producing a second processable data stream; and
   performing one or more query operations on the second processable data stream.

20. A computer program product comprising one or more computer-readable storage media that have thereon computer-executable instructions that are structured such that, when executed by one or more processors of a computing system, cause the computing system to perform steps for performing query processing on streaming data, the steps comprising:
   receiving a data stream of a plurality of data items for each of a plurality of keys;
   producing a processable data stream that includes all of the received plurality of items, wherein producing the processable data stream comprises:
      for each of the data items from the data stream for each of the plurality of keys, ensuring that the data items for each key of the plurality of keys are temporally in order; and
      for each of the data items in the processable data stream, ensuring that the data items temporally lag no more than a given tolerance in the processable data stream. processable data stream.

\* \* \* \* \*